United States Patent [19]
Augustyn

[11] Patent Number: 4,702,603
[45] Date of Patent: Oct. 27, 1987

[54] OPTICAL PHASE DECODER FOR INTERFEROMETERS

[75] Inventor: Walter H. Augustyn, Monroe, Conn.

[73] Assignee: CMX Systems, Inc., Meriden, Conn.

[21] Appl. No.: 757,892

[22] Filed: Jul. 23, 1985

[51] Int. Cl.$^4$ .......................... G01B 9/02; G01J 4/04
[52] U.S. Cl. ................................. 356/351; 250/225; 350/394
[58] Field of Search ............... 356/345, 351, 367, 369; 250/225; 350/394

[56] References Cited

U.S. PATENT DOCUMENTS

| | | |
|---|---|---|
| 3,529,894 | 9/1970 | Hock . |
| 3,601,490 | 8/1971 | Erickson . |
| 3,771,875 | 11/1973 | Russo . |
| 3,822,942 | 7/1974 | Hock . |
| 3,881,823 | 5/1975 | DeLang et al. . |
| 3,976,379 | 8/1976 | Morokuma . |
| 4,360,271 | 11/1982 | Downs et al. . |

FOREIGN PATENT DOCUMENTS

| | | |
|---|---|---|
| 1076835 | 7/1967 | United Kingdom . |
| 1126744 | 9/1968 | United Kingdom . |
| 1309378 | 3/1973 | United Kingdom . |
| 1345204 | 1/1974 | United Kingdom . |
| 2012450 | 7/1979 | United Kingdom . |
| 2107079 | 4/1983 | United Kingdom ................ 356/351 |

Primary Examiner—Davis L. Willis
Assistant Examiner—Matthew W. Koren
Attorney, Agent, or Firm—Hayes & Reinsmith

[57] ABSTRACT

Classical distance measuring optical interferometer systems determine the desired measured distance by measuring phase differences between two light waves; two light waves are needed to uniquely determine distance and direction of motion. A third light wave is used for making the system insensitive to variations in brightness of the light source. This invention provides a distance or optical phase decoding system having three output light waves that uses all of the available light for the measurement and provides for increased resolution of measurement through simple rotational adjustments.

7 Claims, 11 Drawing Figures

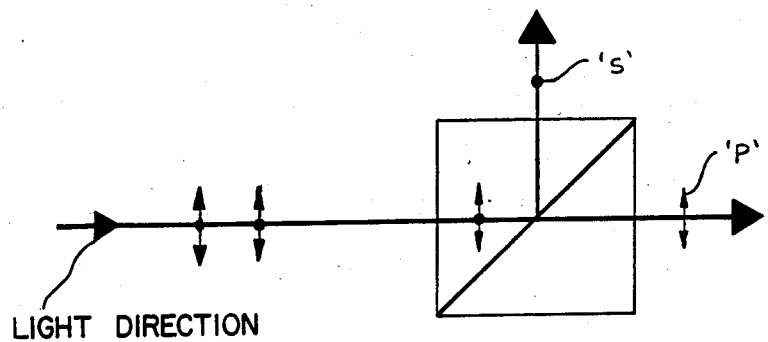
FIG. 1  POLARIZING BEAMSPLITTER (PBS)
(PRIOR ART)
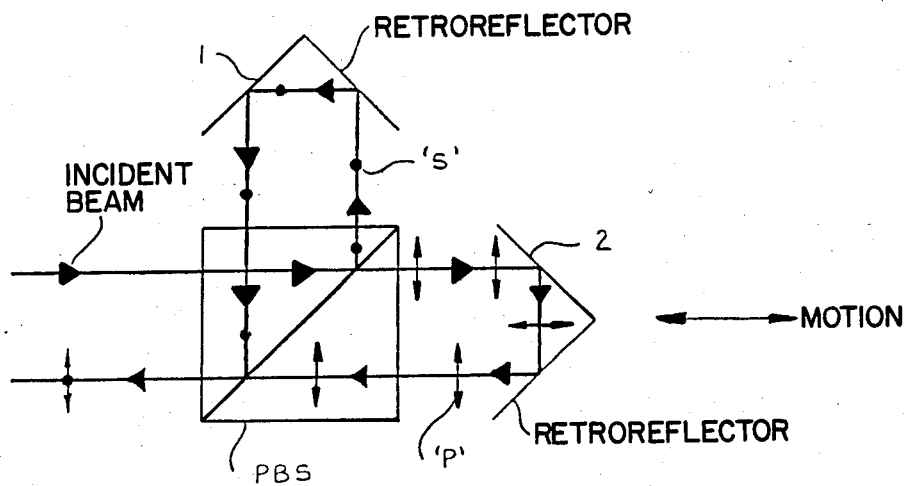
FIG. 2  INTERFEROMETER
(PRIOR ART)

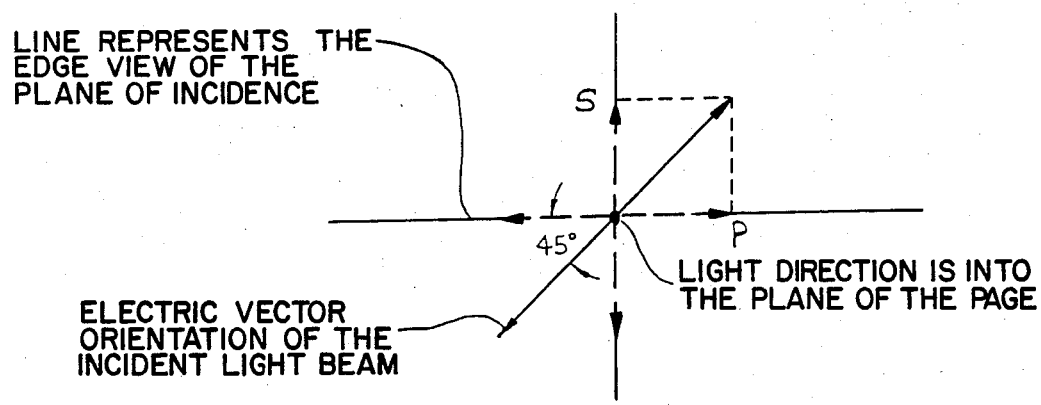
FIG. 2A INCIDENT LIGHT POLARIZATION

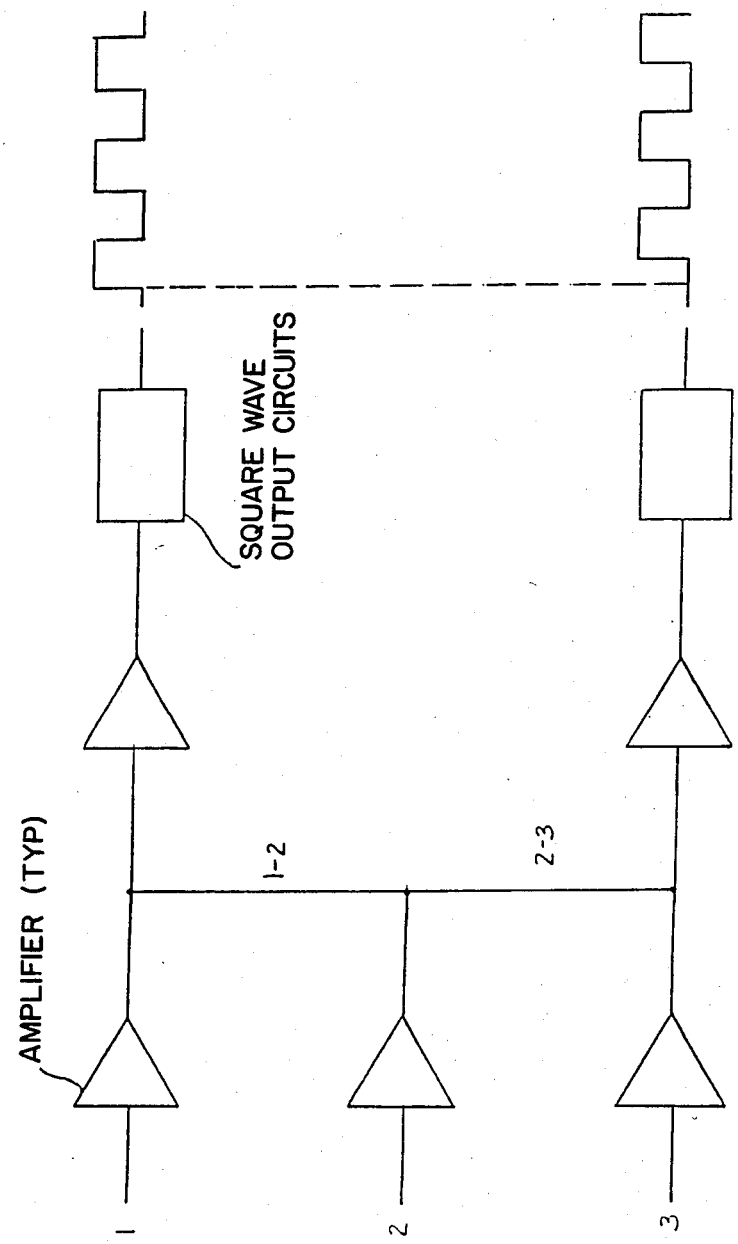
FIG.9 ELECTRONICS BLOCK DIAGRAM

OPTICAL PHASE DECODER FOR INTERFEROMETERS

BACKGROUND OF THE INVENTION

Light is a transverse electromagnetic wave meaning that the electric and magnetic vectors are perpendicular to the direction of travel. Two important characteristics of light waves can be defined, and these are known as intensity and polarization. The square of the magnitude or amplitude of the electric vector is proportional to the intensity (or brightness of the light). The angular orientation of the electric vector about the propagation direction is characterized as its linear polarization direction. Light where the electric vector rotates about the direction of propagation is known as either circularly or elliptically polarized light. Polarizing devices (such as sheet Polaroid) are capable of selectively transmitting, absorbing or reflecting polarized light with a given linear polarization direction. Both monochromatic natural light (filtered to yield a single color) and laser light can be used in devices known as interferometers which are used to measure displacement or distance. Lasers are best suited for such distance measurements when the distances involved exceed 1 cm.

The science of interferometry involves the splitting of light waves, their propagation over different geometrical paths and the study of the optical phase and intensity relationships that occur as a result of these path differences when these light waves are recombined.

Special optical elements known as beamsplitters can also be used to amplitude divide light waves. When these devices are implemented, they create two light waves which each contain one half of the total amount of light originally present in the incident wave. One of the two waves serves as a reference wave, whereas the other serves as the measuring or sensing means. If the electric vectors of the two waves are in phase (both vectors have the same sign) then reinforcement occurs. If the two waves are out of phase (one vector positive and the other negative) then cancellation occurs. If one of the two waves travels a fixed or reference distance and the other travels a variable distance, then the phase of the second wave will change with a change in distance. The interfering waves alternatively cancel and reinforce depending on their phase differences, and this phenomena is used for precise measurement of distance by counting the fringes.

One important class of amplitude division interferometry takes advantage of the polarization properties of the light waves.

The use of polarizing devices makes it possible to observe specific phase difference conditions between the two light waves. Two separate phase conditions need to be observed to uniquely obtain distance and direction of motion relative to a time reference and it was common to use the condition where the phases of the two waves differed by 90 degrees. This method derived from early encoder technology which was an optomechanical technique used for precise distance measurement prior to the invention of the laser. These devices were used for machine control applications.

With the advent of lasers, the 90 degree phase shift corresponds to a distance change of one eighth of a wavelength. With one signal as a reference, the second signal will lead or lag it by this phase shift, therefore providing the necessary direction sensing information. These two signals are known to be in phase quadrature.

When two light waves are divided and then recombined to produce interference fringes, the resultant signal undergoes a sinusoidal modulation and the average value of the signal is offset relative to zero light intensity. Such light signals can be said to consist of an AC or alternating or modulating term with the offset know as a DC term. Furthermore, if the measuring light wave is partially blocked as can be the case in machine control applications where metal chips or cutting fluids interfere with the beam, the peak to valley modulation is reduced. The AC signal does not go to zero and the DC offset term can drift around. The reduction in the AC modulation is generally not serious, but the DC drift can lead to situations where false fringe counts maybe generated when the signals are recombined. It is possible to eliminate the DC term by selecting a third phase condition where the two beams are 180 degrees out of phase. Subtracting the 90 degrees from the 180 degrees out of phase signals and from the in phase signal produces two new signals which are themselves 90 degrees out of phase and independent of the DC term. The prior art discloses many examples by which the three phase conditions can be produced with interfering light waves. These early interferometer systems can all be divided into two subsystems.

One subsystem concerns the amplitude beamsplitting means, and the other subsystem is the means used to select or decode the two or more phase conditions required for signal processing. The amplitude beamsplitting means can be classified as either the Michelson type or the polarizing type. In the Michelson type, light of different polarization conditions can be both transmitted and reflected. In the polarizing type, light of one preferred polarization direction is transmitted while a second polarization direction, 90 degrees to the first, is reflected. Downs (U.S. Pat. No. 4,360,271), Erickson (U.S. Pat. No. 3,601,490) and Hock (U.S. Pat. Nos. 3,529,894 and 3,822,942) are illustrative of the use some form of Michelson type splitting. Russo (U.S. Pat. No. 3,771,875) uses a combination of both types of splitting. Morokuma (U.S. Pat. No. 3,976,379) and Lacombat (W. German Pat. No. 2,111,936) use polarizing type beamsplitting.

Prior art interferometers use a variety of different techniques in the second subsystem in order to decode the different phase conditions. The prior art decoding devices are generally very complex mechanically requiring several beamsplitters, polarizing devices and other optical elements; They generally require special and in some cases very difficult and therefore costly evaporated coatings and the division of the light amplitudes with the decoder is not efficient because in some cases, light not used by the detection means is wasted so as to effectively preclude using a single laser source for multi axis distance measurement applications.

SUMMARY OF THE INVENTION

It is a principal object of the invention to provide an interferometer of the polarizing amplitude beam splitter type having improved light efficiency using a single laser source.

It is a further object of the invention to provide an improved optical phase decoder that is of simplified design, has few mechanical components and is easily constructed to provide long reliable service.

It is an additional object of this invention to provide a light efficient, three channel decoding apparatus for optical interferometers.

The present invention generally meets the objects by providing a single laser source interferometer requiring only a first polarizing beam splitter, a pair of retroreflectors for each portion of the split beam and an optical phase decoder including a second polarizing beam splitter and a partial polarizer to provide three discrete light signals which are detected to present desired positional and directional information.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the various ways in which the principles of the invention are employed.

BRIEF DESCRIPTION OF THE DRAWINGS

FIG. 1 is a schematic drawing of a prior art polarizing beamsplitter;

FIG. 2A is a schematic diagram showing polarization splitting of a single beam of light.

FIG. 2 is a schematic of a prior art interferometer;

FIGS. 6 and 6(a) provide schematic details of the optical phase decoder of this invention;

FIG. 9 is a block diagram of suitable electronic circuitry.

Before commencing description of a preferred embodiment of the invention it is believed useful to briefly consider certain fundamental aspects of the prior art and, to that end, a polarizing beam splitter (PBS) shall be described first and a beamsplitter of the polarizing type is shown in FIG. 1. Light polarized parallel (electric vector orientation) to the plane of the diagram (also known as the plane of incidence) is depicted by a double headed arrow. This light is completely transmitted by the PBS. Light polarized perpendicular to the plane of incidence is shown by a dot. This light is completely reflected by the PBS. The parallel and perpendicular polarization are also known as 'P' and 'S'.

To produce the desired phase shift, or a time delay or advance, between the 'P' and 'S' polarization states so as to effect distance measurement, it is common practice to use two additional mirrors or retroreflecting prisms such as 1 and 2 in FIG. 2, a basic prior art interferometer. The mirrors or retroreflectors redirect the two beams so that they can be recombined. Mirror or retroreflector 1 is the reference path and mirror 2 is the measuring path.

To produce the proper polarization splitting of the prior art with a single beam of light requires the incident light wave polarization vector to be oriented at 45 degrees to the plane of incidence as shown in FIG. 2A. Two dotted arrows show how this vector can be resolved into its components along the 'S' and 'P' directions. The reflected component, 'S', travels the path to the stationary retroreflector 1 and serves as the reference wave. The transmitted component 'P', travels the path to the moving retroreflector and is advanced or delayed depending on its total path relative to the reference wave. A one half wavelength motion of the retroreflector 2 produces a one wavelength phase shift. Upon recombination at the PBS, the two waves would normally be said to interfere with one another. However, because the two waves consist of perpendicular or orthogonal polarization vectors, they cannot produce interference at the point where they recombine.

Figure 3:
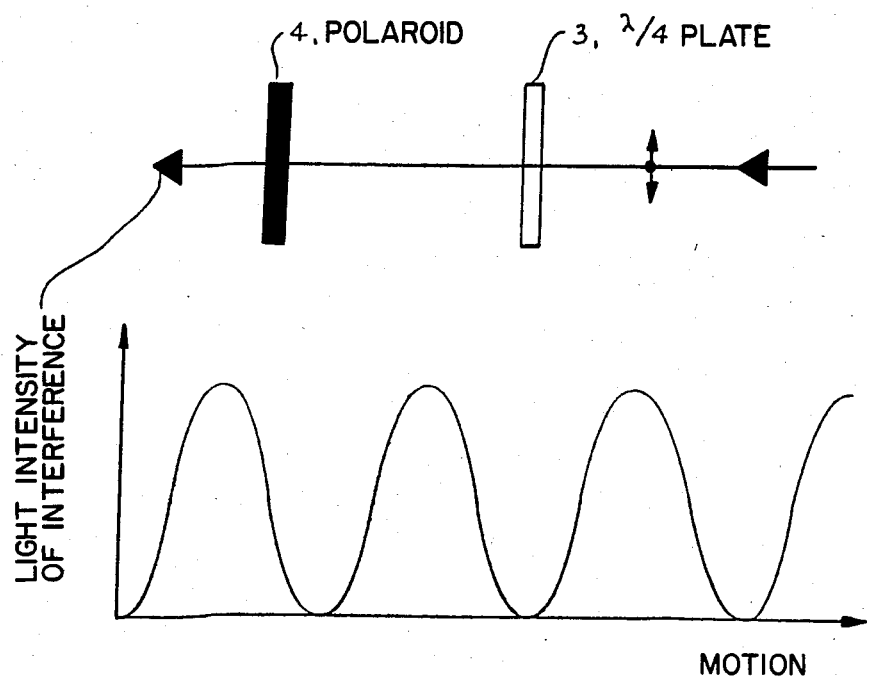
FIG. 3 is a prior art schematic showing the relationship between light intensity and certain components of a prior art system.

In order to produce observable interference effects between the P and S compenents requires the use of polarization phase decoding. Such a prior art subsystem may include a quarter wave plate 3 and a polarizing device 4 such as shown in prior art schematic FIG. 3. The quarter wave plate is a device which when properly positioned causes the P and S linear polarizations to become circularly polarized with their electric vectors rotating in opposite directions. In other words, one vector rotates clockwise and the other vector rotates counterclockwise. When the two vectors are coincident with each other at some angular position, they will produce maximum light intensity which can be observed by aligning the sheet polaroid to the same angular position. The angle at which the two vectors are coincident varies with the axial phase shift between the original P and S vectors. The resultant light intensity therefore varies from a maximum to zero as motion of the retroreflector occurs. This variation in intensity is the AC portion of the interference fringe.

Figure 4:
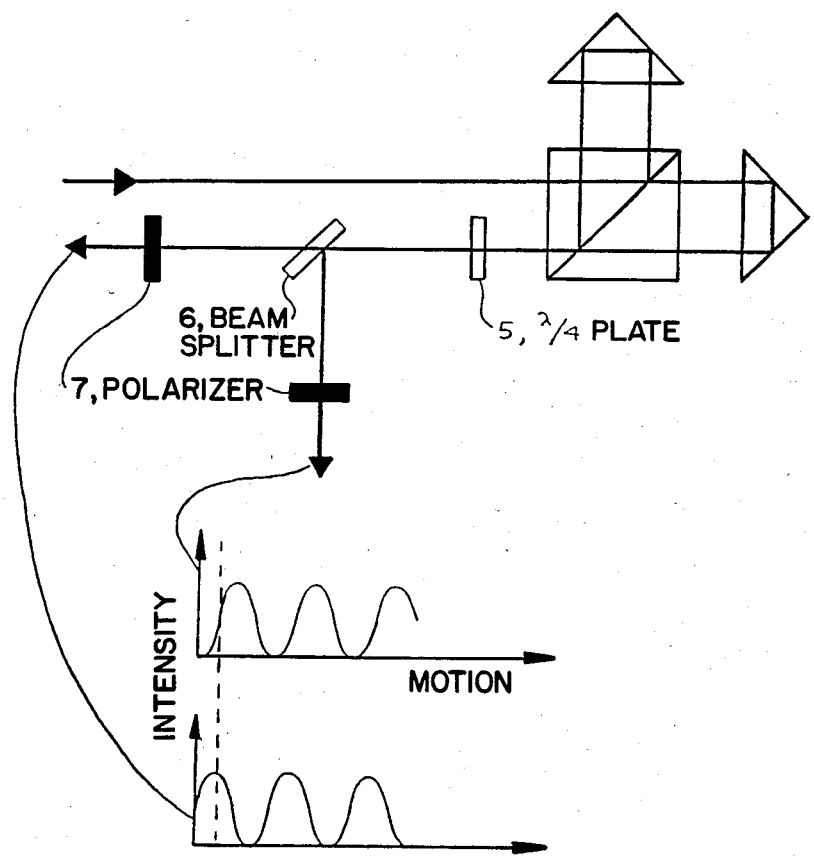
FIG. 4 is a prior art schematic showing an interferometer and relating motion and light intensity to the basic device.

If the incident P and S polarized waves are transmitted through a quarter wave plate 5 and then split by an ordinary beamsplitter 6 as shown in the prior art schematic of FIG. 4, two linear polarizing devices 7 placed at the exit faces of the beamsplitter can be adjusted for different angular orientations. Maximum interference fringe intensity for each orientation will occur at two different times at the exit faces of the polarizers while the retroreflector is moved. The difference in time corresponds to the phase shift set by the relative angular orientations of the two linear polarizing devices. This information allows distance to be measured. The beam can be split several times in the above fashion leading to a multiple of channels each of which can measure a different phase shift.

DETAILED DESCRIPTION OF A PREFERRED EMBODIMENT

With the foregoing prior art fundamentals in mind, a principal feature of the present invention is the manner in which a threefold splitting of the light emerging from the PBS and quarter wave plate can be accomplished with a system comprised of a partial polarizer such as a Brewster plate and one additional polarizing beamsplitter and without the use of additional polarizers, special coatings, etc. By way of explanation, a partial polarizer or Brewster plate is a device which suppresses the reflection of the polarization parallel to the plane of incidence at a specific incident angle and transmits all of the light of that polarization state. The polarization state perpendicular to that plane of incidence is partially reflected and transmitted. Such a device, by reflecting only one polarization state, eliminates the need for linear polarizers which absorb light and lead to inefficient systems. Like a polarizer, a Brewster plate can be rotated about the incident radiation direction to select any specific phase condition. When the plate is rotated by 45 degrees and then combined with an additional PBS, it produces an apparatus capable of taking incoming light and separating it into three discrete phase related signals which can then be manipulated to effect the distance determination. Each of the three signals with this particular arrangement are phase shifted by 90 degrees relative to one another.

Figure 5:
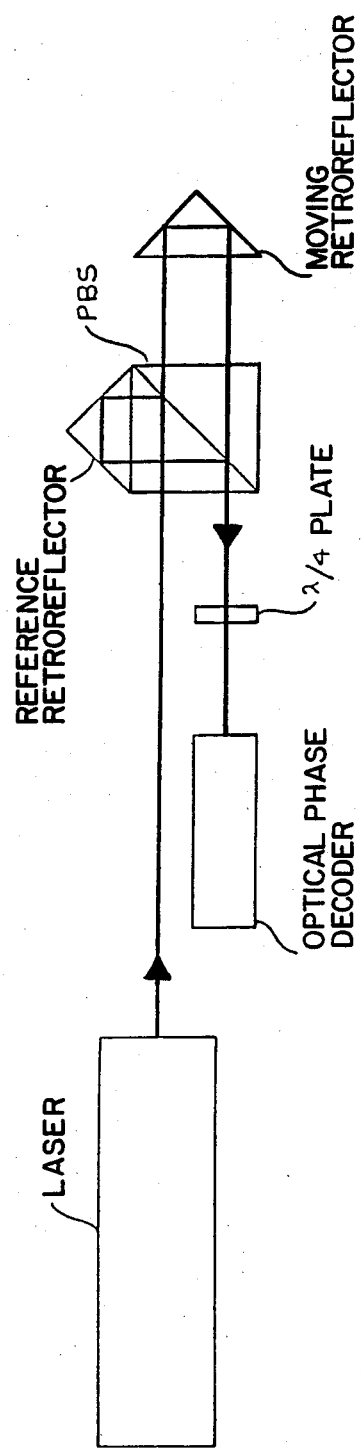
FIG. 5 is a block-diagram of the interferometer and optical phase decoder of this invention.

The apparatus identified as an optical phase decoder (OPD) is shown in block diagram form in FIG. 5. A Brewster plate and polarizing beamsplitter are included in the optical phase decoder.

Figure 6:
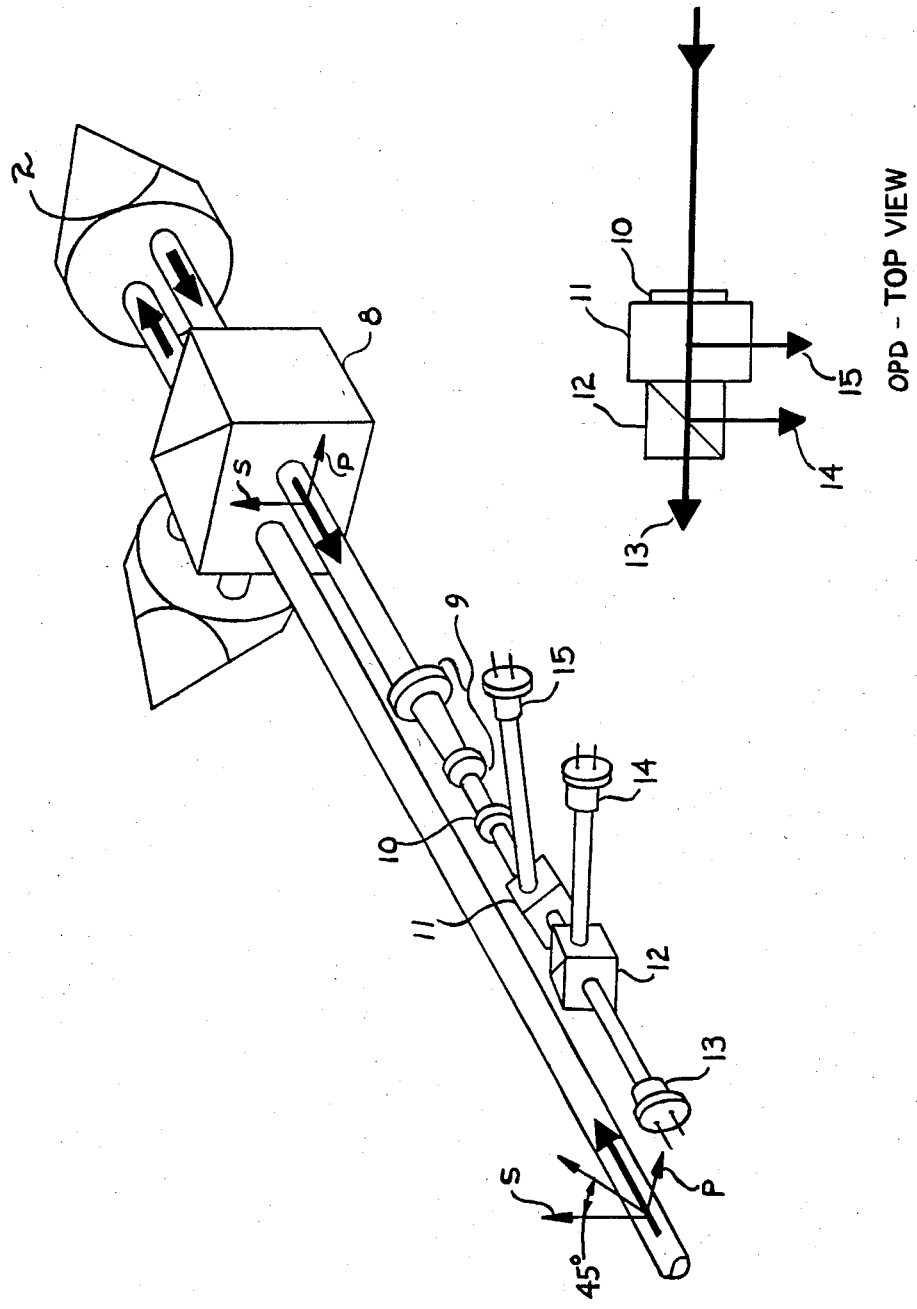

FIGS. 6 and 6A provide a more detailed view of the OPD and shall be referred to in the following description. For convenience of mounting the optical elements, the physical arrangement shown places the quarter wave plate in the housing containing the optical phase decoding elements. The light which engages from PBS 8 first enters a Galilean telescope 9 which is conveniently utilized for reducing the beam diameter in order to make the OPD more compact. The light emerging from the telescope then enters the quarter wave plate 10 which converts each of the linearly polarized beams into two counter rotating circularly polarized beams. Quarter wave plate 10 is for compactness, cemented or otherwise mechanically attached to partial polarizing device 11 such as a Brewster plate which is shown rotated so that a line perpendicular to its reflecting plane is in a plane oriented at 45 degrees to the entering 'S' and 'P' polarization directions. It may be stated that a Brewster plate is only one form of partial polarizer which utilizes externally reflected light. Another form of partial polarizer can utilize internally reflected light to accomplish the same purpose.

It is desirable that the light emerging from the quarter wave plate be elliptically polarized so that signal balance in detector channels 13, 14 and 15 can be achieved without phase distortion. This is accomplished by rotation of the quarter wave plate away from the position where circularly polarized light is created. The partial polarizing device is cemented or mechanically attached to a second PBS 12 oriented parallel to the interferometer PBS 8. The angular orientation of the partial polarizer allows the selection of interference patterns such that they can bear arbitrary but known phase relationships relative to one another. The phase relation of the existing beams shown in FIG. 6 and described above, is such that beam 14 lags beam 13 by 180 degrees and beam 15 by 90 degrees. By subtracting the detected light signal 14 from the signal at 15 and the signal at 13 from the signal at 15 allows the DC bias signal to be eliminated. The OPD described above only produces three beams of light rather than the four as in the prior art and is simpler and more compact in addition to being more light efficient. In addition, the OPD utilizes polarization splitting to eliminate the creation of spurious interference fringes caused by small amounts of both polarizations present at the detector.

Figure 7:
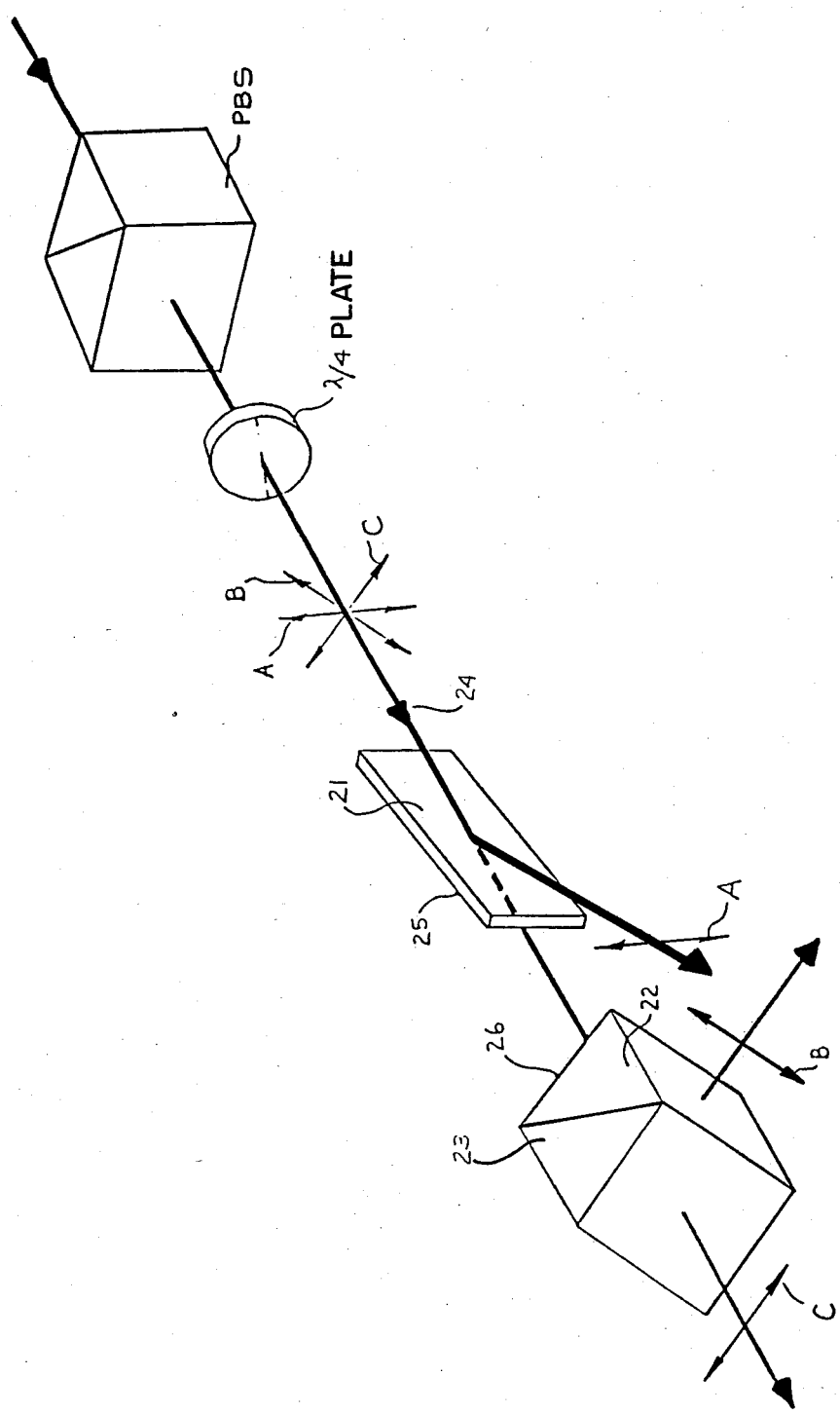
FIG. 7 is a detailed showing, in schematic form, of the basic elements of the decoder.

Certain aspects of the preferred embodiment of the invention are partially illustrated in FIG. 7. The principal directions of maximum interference intensities are characterized by the three arrows labeled A, B and C. Vectors B and C are orthogonal to one another and their relative angular orientations therefore correspond to two signals which are axially 180 degrees out of phase with one another. Vector A is shown making an angle of 45 degrees relative to B and C and therefore corresponds to a signal which is 90 degrees out of phase with those vectors. (See FIG. 8). As retroreflector 2 moves, the maximum light intensity will, as an example, first be observed by the C direction, then along the A and B directions respectively. The partial polarizer 23 reflects a portion of the light parallel to the A direction only and transmits the remainder. At Brewster's angle, no light polarized in any other direction is reflected. As previously described, a Brewster window is typical of the type of classical device which exhibits these characteristics. Components B and C are totally reflected and transmitted respectively by the PBS which is assembled from 24 and 25 in FIG. 7.

The device can be further simplified by combining partial polarizer 23 and PBS element 24 into one piece of glass, thereby eliminating surfaces 27 and 28 and their anti reflection coatings. This type of design reduces the glass path and provides a very compact arrangement of the glass elements. Prism 25 is then bonded to the assembly.

Figure 8:
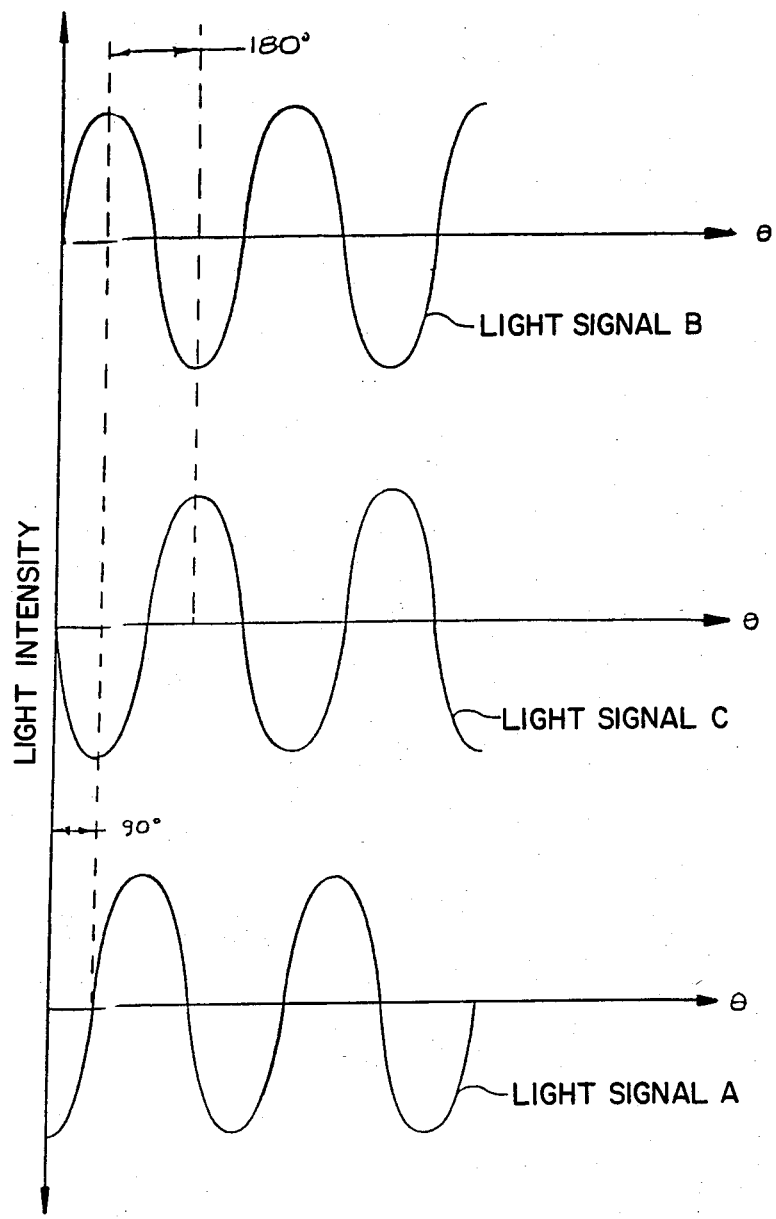
FIG. 8 is a drawing showing the phase relationship of the three light signals of FIG. 7.

For the example illustrated in FIGS. 6 and 7 where three signals bear the relative phase relationship shown in FIG. 8, a simple electronics circuit suffices for signal amplification and subtraction (FIG. 9). The first stage operational amplifiers are set up so that three electrical signals of equal magnitude are obtained for three light inputs. The second stage operational amplifiers take the signal differences and convert the sinusoidal voltages to square wave outputs which are in quadrature.

Finer phase shift detection is performed with a different type of circuit which seeks sine wave voltage zero crossings corresponding to the phase shifts but such circuit variations are not essential to the invention.

As will be apparent to persons skilled in the art, various modifications, adaptations and variations of the foregoing specific disclosure can be made without departing from the teachings of this invention.

I claim:

1. In an interferometer having a source of a primary beam of coherent light and means for dividing the source beam to form polarized reference and measuring beams and for recombining the reference and measuring beams, an optical phase decoder comprising a partial polarizer device for receiving the recombined reference and measuring beams to provide a first optical output beam which comprises a portion of the recombined beam, a polarizing beam splitter for accepting the remainder of the recombined beam passed by the partial polarizer to provide second and third output beams and electrical circuit means including a detector for each of the three beam outputs to provide an electrical signal proportional thereto and for measuring the phase relationships thereof.

2. The optical phase decoder of claim 1 wherein the partial polarizer is rotationally adjustably positioned to permit selection of interference patterns.

3. The optical phase decoder of claim 1 wherein the partial polarizer is affixed to the polarizing beam splitter in the desired rotational position of 45°.

4. An interferometer comprising a source of a primary beam of coherent light, a first polarizing beam splitter for dividing the source beam to form polarized reference and measuring beams and for recombining the reference and measuring beams after the beams impinge upon reference and moving retroreflectors, a quarter wave plate for receiving the recombined beams to effect elliptical polarization thereof, a partial polarizer device for receiving the elliptically polarized, recombined reference and measuring beams to provide a first optical output beam which comprises a portion of the recombined beam, a second polarizing beam splitter for accepting the remainder of the recombined beam passed by the partial polarizer to provide second and third output beams and electrical circuit means including a detector for each of the three beam outputs to provide an electrical signal proportional thereto and for measuring the phase relationships thereto.

5. The interferometer of claim 4 wherein the one-quarter wave plate, partial polarizer device and second polarizing beam splitter are bonded together in a fixed angular and partial relationship.

6. The interferometer of claim 5 wherein a Galilean telescope is interposed in the recombined light path between the first polarizing beam splitter and the one-quarter wave plate.

7. The optical phase discrimination of claim 1 wherein the first, second and third output beams have a phase relationship of 0, 90 degrees and 180 degrees.

* * * * *

UNITED STATES PATENT AND TRADEMARK OFFICE
CERTIFICATE OF CORRECTION

PATENT NO. : 4,702,603
DATED : October 27, 1987
INVENTOR(S) : Walter H. Augustyn It is certified that error appears in the above—identified patent and that said Letters Patent is hereby corrected as shown below:

Column 3, line 24 wherein the sentence "FIG. 2A is a schematic diagram showing polarization splitting of a single beam of light;" should read --FIG. 2 is a schematic of a prior art interferometer;--

Column 3 line 26, wherein the sentence "FIG. 2 is a schematic of a prior art interferometer;" should read --FIG. 2A is a schematic diagram showing polarization splitting of a single beam of light;--

Column 4, line 16, wherein the word "compenents" should read --components--.

Column 5, line 20, wherein the word "engages" should read --emerges--.

Signed and Sealed this

Nineteenth Day of July, 1988

Attest:

DONALD J. QUIGG

*Attesting Officer*     *Commissioner of Patents and Trademarks*